United States Patent
Jung et al.

(10) Patent No.: US 12,184,449 B2
(45) Date of Patent: Dec. 31, 2024

(54) METHOD AND DEVICE FOR PROCESSING DATA ASSOCIATED WITH MESSAGES TRANSMITTABLE VIA A BUS SYSTEM

(71) Applicant: Robert Bosch GmbH, Stuttgart (DE)

(72) Inventors: Ramona Jung, Stuttgart (DE); Arthur Mutter, Neuhausen (DE); Thomas Enderle, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 98 days.

(21) Appl. No.: 17/449,725

(22) Filed: Oct. 1, 2021

(65) Prior Publication Data

US 2022/0109589 A1    Apr. 7, 2022

(30) Foreign Application Priority Data

Oct. 6, 2020   (DE) .......................... 102020212586.4

(51) Int. Cl.
*H04L 12/40*    (2006.01)
*H04L 9/40*    (2022.01)
*H04L 41/0893*    (2022.01)

(52) U.S. Cl.
CPC ...... *H04L 12/4015* (2013.01); *H04L 41/0893* (2013.01); *H04L 63/0263* (2013.01)

(58) Field of Classification Search
CPC ............. H04L 12/4015; H04L 41/0893; H04L 63/0263
See application file for complete search history.

(56) References Cited

U.S. PATENT DOCUMENTS

| | | | |
|---|---|---|---|
| 7,756,929 B1 * | 7/2010 | Pettigrew | H04L 51/212 709/224 |
| 9,787,838 B1 * | 10/2017 | Lembersky | H04M 3/5191 |
| 2011/0289581 A1 * | 11/2011 | Gourevitch | H04L 63/08 709/206 |
| 2019/0230681 A1 * | 7/2019 | Han | H04W 24/10 |
| 2020/0186499 A1 * | 6/2020 | Benjamin | H04L 63/0236 |

* cited by examiner

*Primary Examiner* — Zhensheng Zhang
(74) *Attorney, Agent, or Firm* — NORTON ROSE FULBRIGHT US LLP; Gerard A. Messina

(57) ABSTRACT

A method for processing data associated with messages transmittable via a bus system. The method includes: providing multiple filter groups, each filter group of the multiple filter groups including at least one filter rule, for example, for at least some of the messages, filtering at least one message with the aid of at least two different filter groups of the multiple filter groups.

19 Claims, 7 Drawing Sheets

Figure 1A:
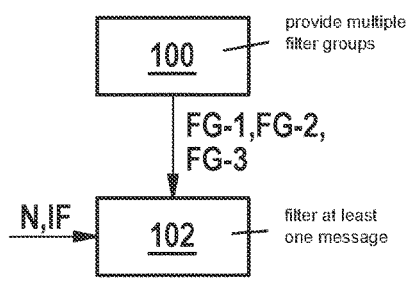

METHOD AND DEVICE FOR PROCESSING DATA ASSOCIATED WITH MESSAGES TRANSMITTABLE VIA A BUS SYSTEM

CROSS REFERENCE

The present application claims the benefit under 35 U.S.C. § 119 of German Patent Application No. DE 102020212586.4, filed on Oct. 6, 2020, which is expressly incorporated herein by reference in its entirety.

FIELD

The present invention relates to a method for processing data associated with messages transmittable via a bus system.

The present invention furthermore relates to a device for processing data associated with messages transmittable via a bus system.

SUMMARY

Exemplary specific embodiments of the present invention relate to a method for processing data associated with messages transmittable via a bus system, including: providing multiple filter groups, each filter group of the multiple filter groups including at least one filter rule, for example for at least some of the messages, filtering at least one message with the aid of at least two different filter groups of the multiple filter groups. This enables in further exemplary specific embodiments a flexible definition of (resulting) filters, which are based, for example, on the multiple filter groups and the filter rules contained in each of them.

In further exemplary specific embodiments of the present invention, the bus system is, for example, a CAN (controller area network) bus, or a CAN FD or CAN XL bus system. For example, the bus system may include a differential transmission medium, for example, including two bus lines.

The principle according to the specific embodiments is not restricted to CAN or CAN-based bus systems but rather in further exemplary specific embodiments may also be applied to other systems for processing, for example, sending and/or receiving messages.

In further exemplary specific embodiments of the present invention, it is provided that providing the multiple filter groups at least includes: associating a first number of filter rules with a first filter group, associating a second number of filter rules with a second filter group.

In further exemplary specific embodiments of the present invention, it is provided that the method furthermore includes: predefining a sequence of the at least two different filter groups, for example, for the filtering.

In further exemplary specific embodiments of the present invention, it is provided that the method furthermore includes: assigning different access rights to the at least two different filter groups.

In further exemplary specific embodiments of the present invention, it is provided that the method furthermore includes: assigning different functionalities to the at least two different filter groups, for example, the different functionalities characterizing at least one of the following elements: a) rule type, b) maximum number of filter rules per filter group.

In further exemplary specific embodiments of the present invention, it is provided that the method furthermore includes: a) at least temporarily filtering messages to be sent via the bus system and/or at least temporarily filtering messages received via the bus system.

In further exemplary specific embodiments of the present invention, it is provided that the method furthermore includes: evaluating in temporal succession multiple filter rules of a first filter group with respect to the at least one message.

In further exemplary specific embodiments of the present invention, it is provided that the method furthermore includes: checking whether one of the multiple filter rules applies to the at least one message and, optionally, if one of the multiple filter rules applies to the at least one message, evaluating at least one filter rule of at least one second filter group, the second filter group being different from the first filter group. In further exemplary specific embodiments, this principle may also be expanded to further filter groups, for example, by checking whether the at least one filter rule of the second filter group applies to the at least one message and, optionally, if the at least one filter rule of the second filter group applies to the at least one message, evaluating at least one filter rule of at least one third filter group, the third filter group being different, for example, from the first filter group and/or the second filter group.

In further exemplary specific embodiments of the present invention, it is provided that the method furthermore includes: discarding the at least one message if no filter rule of the multiple filter groups applies. In further exemplary specific embodiments, it is provided that, if a filter rule of at least one of the multiple filter groups applies, thus a message filtered or checked thereby corresponds to the filter criterion or the filter criteria of the filter rule, the message is, for example, not discarded, but rather, for example, further processed, for example, in the context of a receiving process or a sending process.

In further exemplary specific embodiments of the present invention, it is provided that the method furthermore includes: associating filter rules which relate to a VCAN (virtual CAN) ID and/or a useful data type with a first filter group of the multiple filter groups and/or associating filter rules which relate to a message identification and/or an address of a sender and/or receiver with a second filter group of the multiple filter groups.

In further exemplary specific embodiments of the present invention, it is provided that the method furthermore includes: at least partially temporally overlapping evaluation of filter rules of the same and/or different filter groups, for example, results of the evaluation of filter rules of the same filter group being subjected to an OR linkage with one another, for example, results of the OR linkages of different filter groups being subjected to an AND linkage with one another.

In further exemplary specific embodiments of the present invention, it is provided that at least one first filter rule includes a first piece of information which characterizes at least one further filter rule and/or a further filter group which is to be evaluated, for example, after the evaluation of the first filter rule. Based on the first piece of information, in further exemplary specific embodiments, filtering of a message may thus be continued using the filter rules thus specified or the filter group thus specified.

Further exemplary specific embodiments of the present invention relate to a device for carrying out the method according to the specific embodiments.

Further exemplary specific embodiments relate to a computer-readable storage medium, including commands which, upon the execution by a computer, prompt it to carry out the method according to the specific embodiments.

Further exemplary specific embodiments of the present invention relate to a computer program including commands which, upon the execution of the program by a computer, prompt it to carry out the method according to the specific embodiments.

Further exemplary specific embodiments of the present invention relate to a data carrier signal which transmits and/or characterizes the computer program according to the specific embodiments.

Further exemplary specific embodiments of the present invention relate to a bus user for a bus system, including at least one of the following elements: a) a device according to the specific embodiments, b) a computer-readable storage medium according to the specific embodiments, c) a computer program according to the specific embodiments, d) a data carrier signal or a representation of the data carrier signal according to the specific embodiments.

Further exemplary specific embodiments of the present invention relate to a use of the method according to the specific embodiments and/or the device according to the specific embodiments and/or the computer-readable storage medium according to the specific embodiments and/or the computer program according to the specific embodiments and/or the data carrier signal according to the specific embodiments and/or the bus user according to the specific embodiments for at least one of the following elements: a) filtering, for example hierarchical filtering, of the at least one message with the aid of the multiple filter groups, b) increasing a level of security, c) avoiding processing all existing filter rules, d) reducing a complexity of individual filter rules, e) enabling different authorization levels with respect to a use, for example configuration, of filters.

Further features, possible applications, and advantages of the present invention result from the following description of exemplary specific embodiments of the present invention which are shown in the figures. All features described or shown form the subject matter of the present invention alone or in any arbitrary combination, regardless of their wording or depiction in the description or in the figures.

BRIEF DESCRIPTION OF EXAMPLE EMBODIMENTS

FIG. 1A schematically shows a simplified flowchart of a method according to exemplary specific embodiments of the present invention.

Figure 1B:
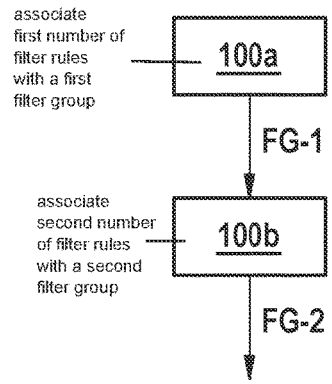

FIG. 1B schematically shows a simplified flowchart of a method according to further exemplary specific embodiments of the present invention.

Figure 1C:
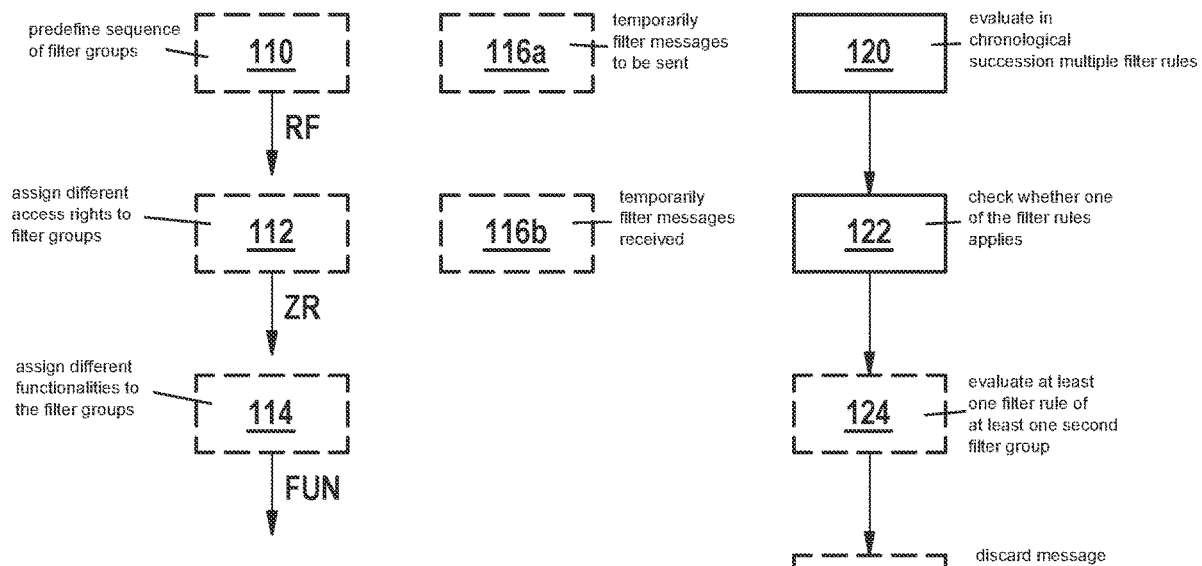

FIG. 1C schematically shows a simplified flowchart of a method according to further exemplary specific embodiments of the present invention.

Figure 1D:
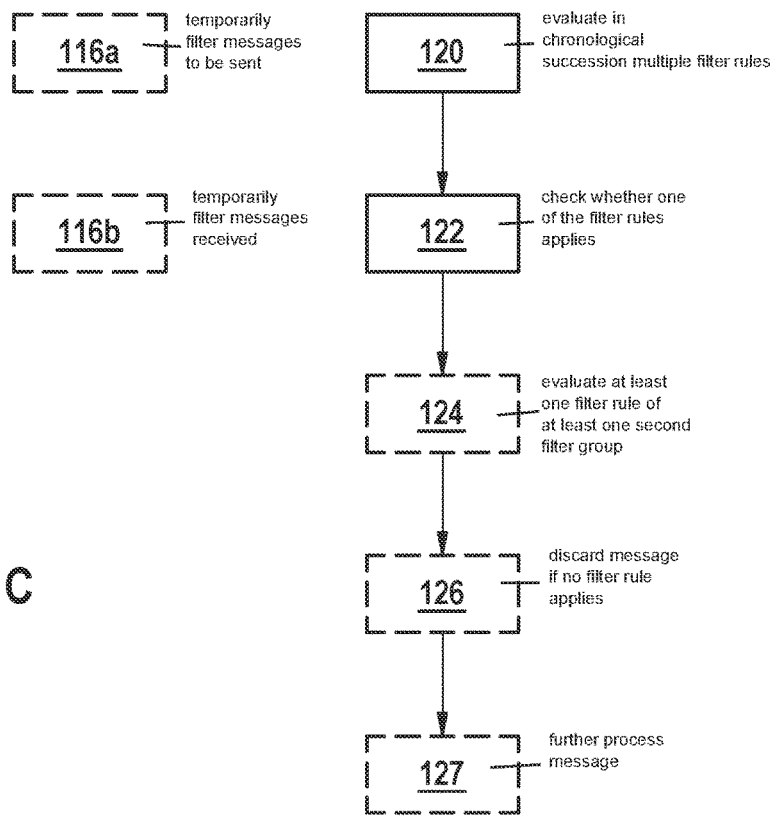

FIG. 1D schematically shows a simplified flowchart of a method according to further exemplary specific embodiments of the present invention.

Figure 1E:
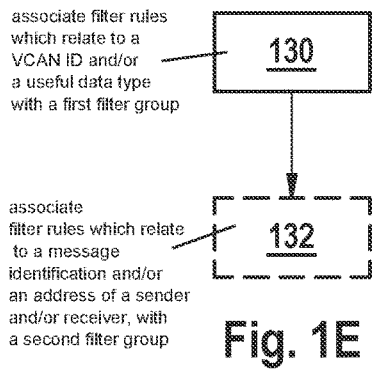

FIG. 1E schematically shows a simplified flowchart of a method according to further exemplary specific embodiments of the present invention.

Figure 1F:
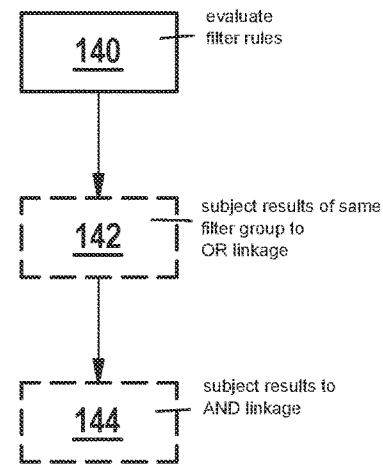

FIG. 1F schematically shows a simplified flowchart of a method according to further exemplary specific embodiments of the present invention.

Figure 2:
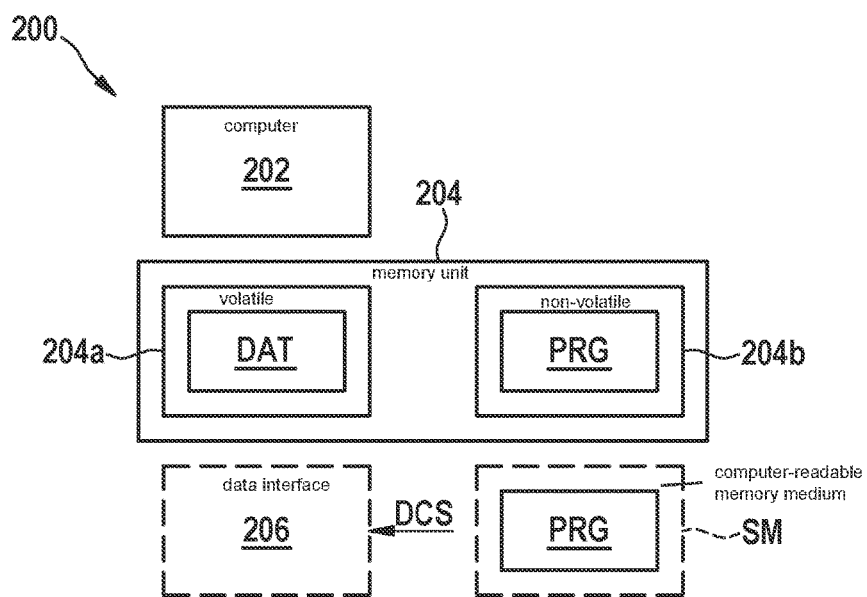

FIG. 2 schematically shows a simplified block diagram of a device according to further exemplary specific embodiments of the present invention.

Figure 3:
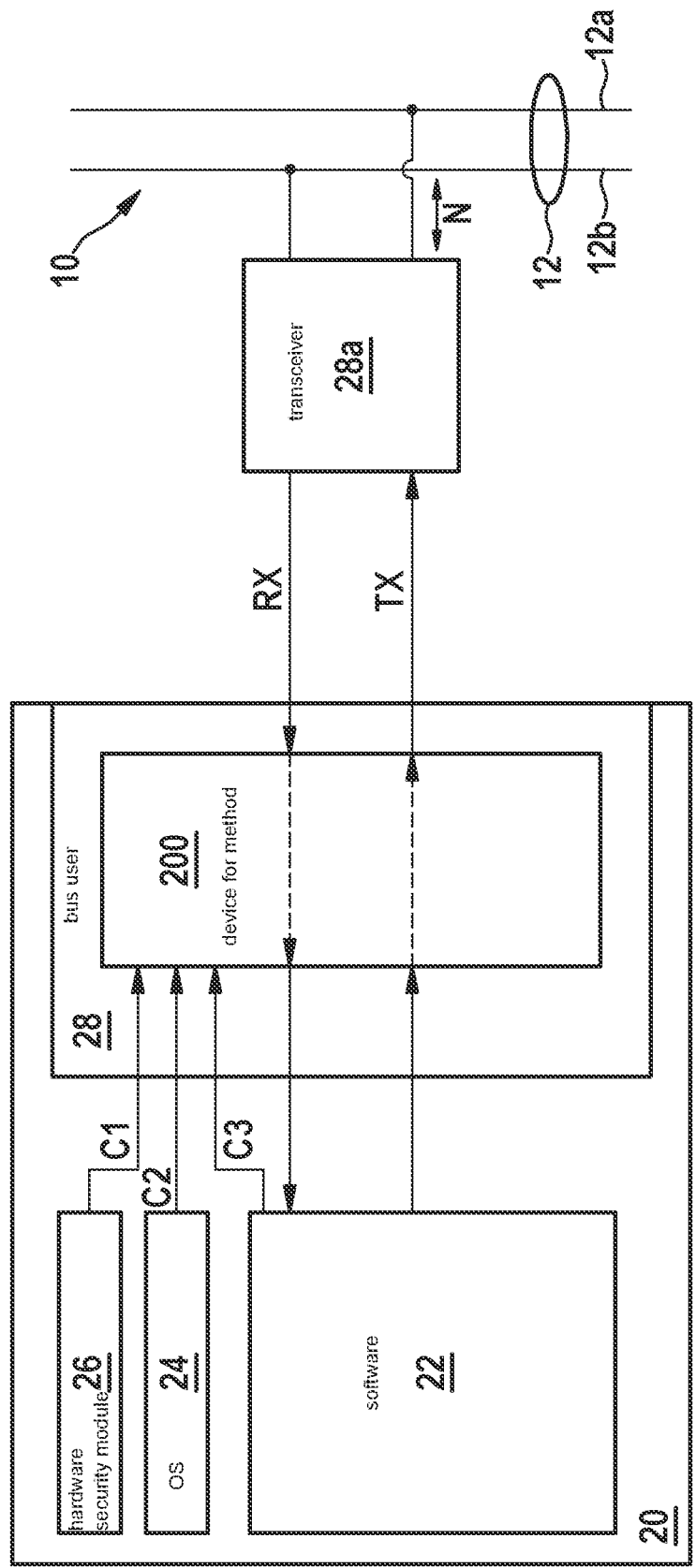

FIG. 3 schematically shows a simplified block diagram according to further exemplary specific embodiments of the present invention.

Figure 4:
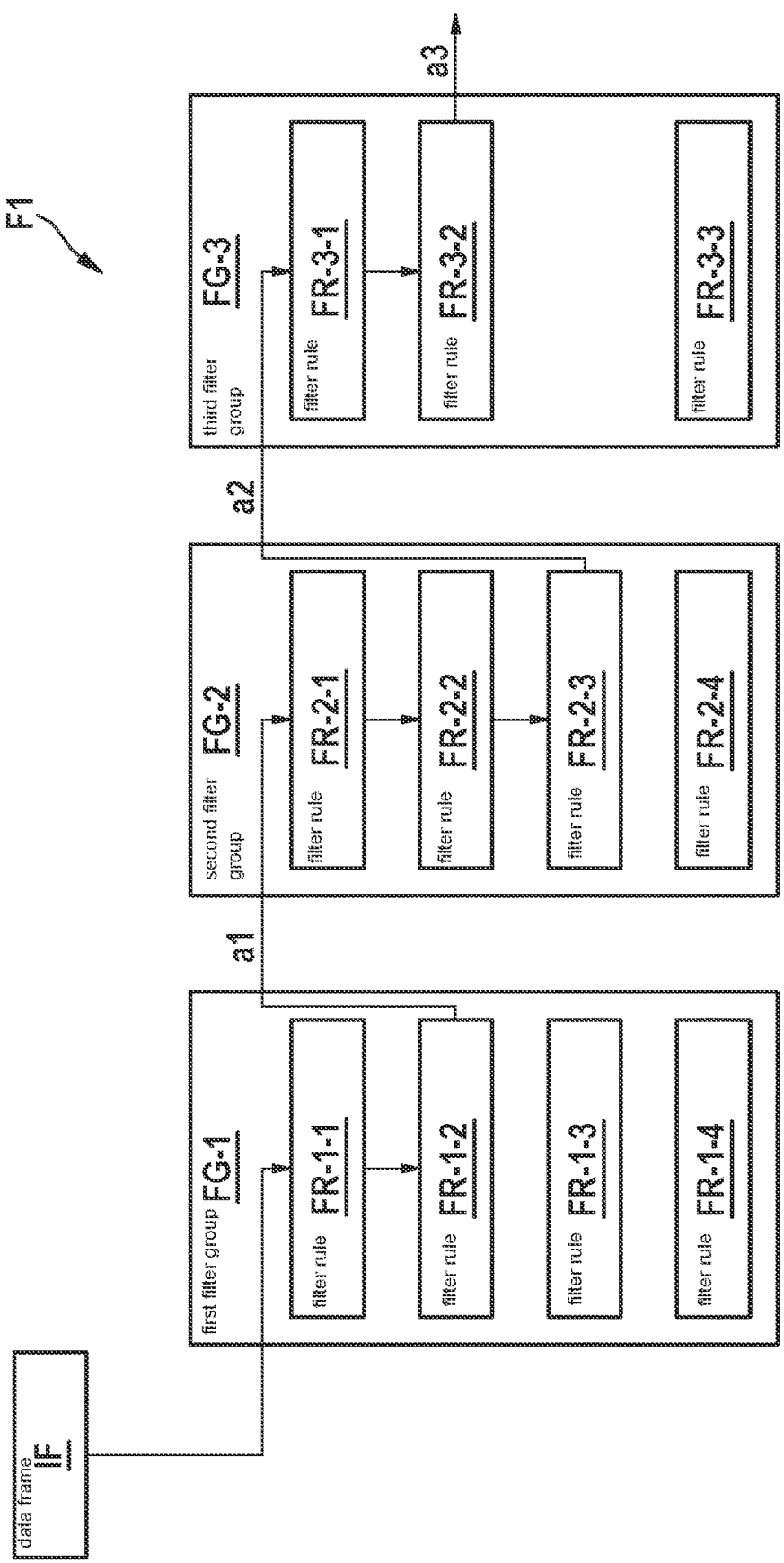

FIG. 4 schematically shows a simplified block diagram according to further exemplary specific embodiments of the present invention.

Figure 5:
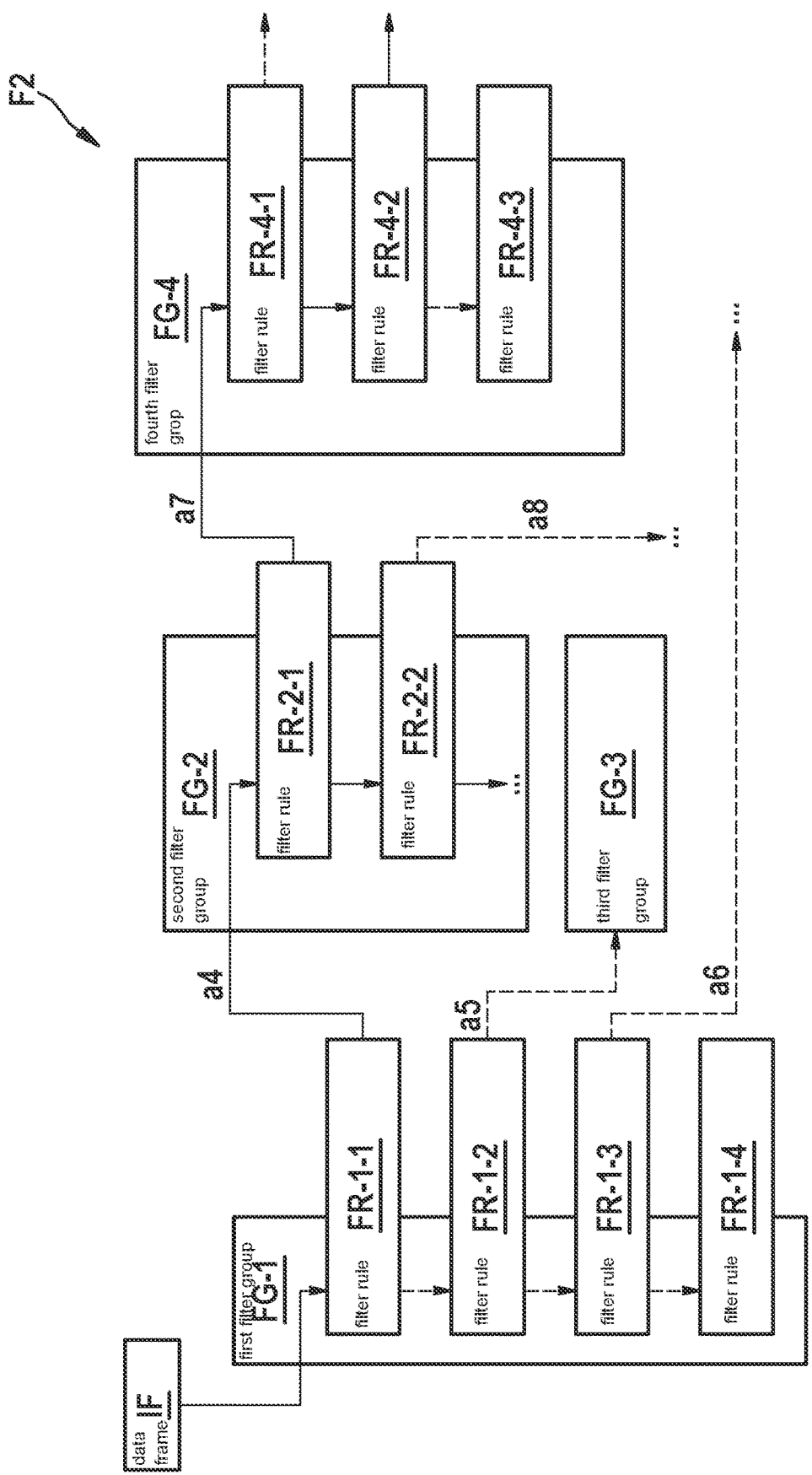

FIG. 5 schematically shows a simplified block diagram according to further exemplary specific embodiments of the present invention.

Figure 6:
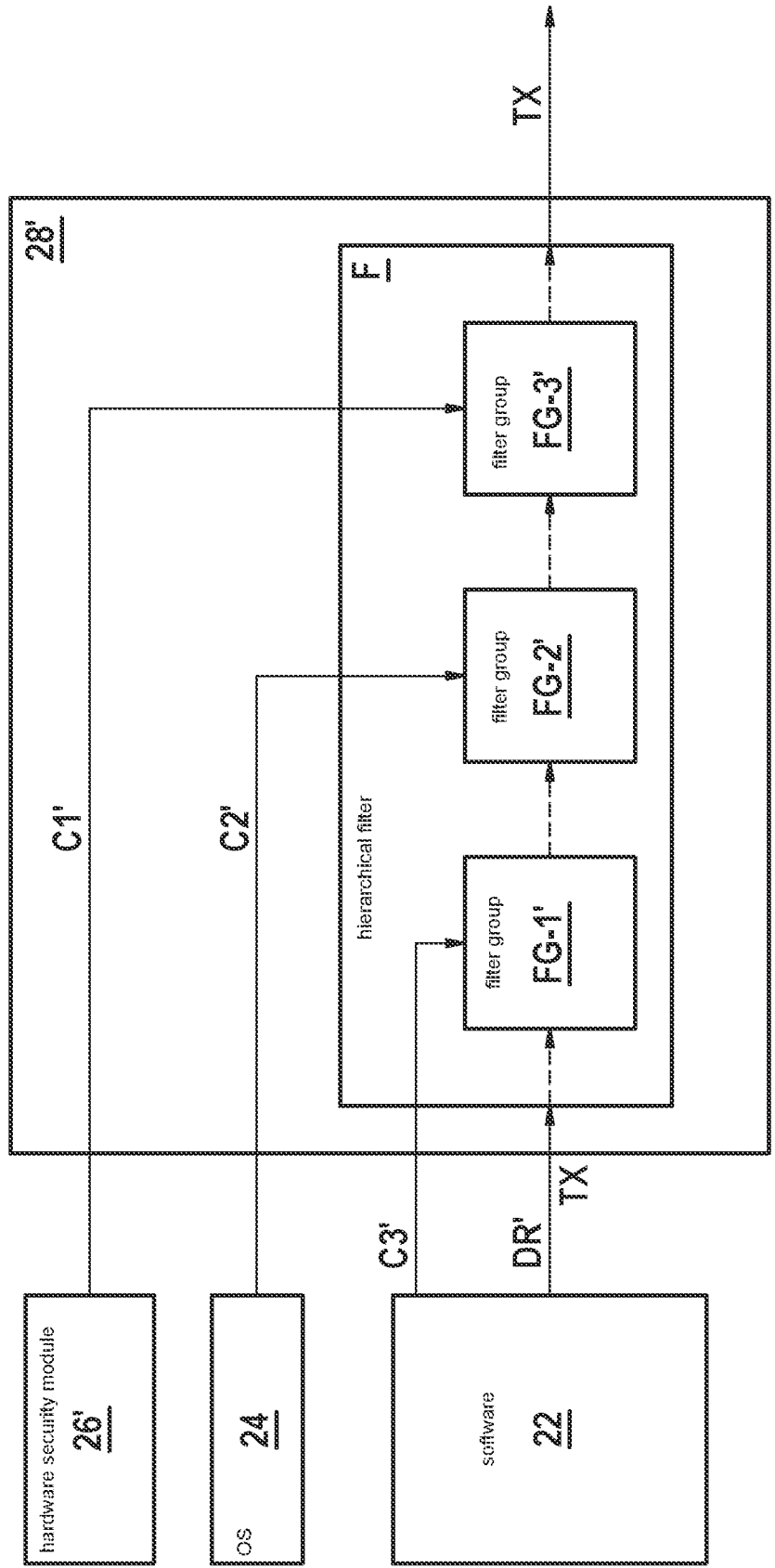

FIG. 6 schematically shows a simplified block diagram of a device according to further exemplary specific embodiments of the present invention.

Figure 7:
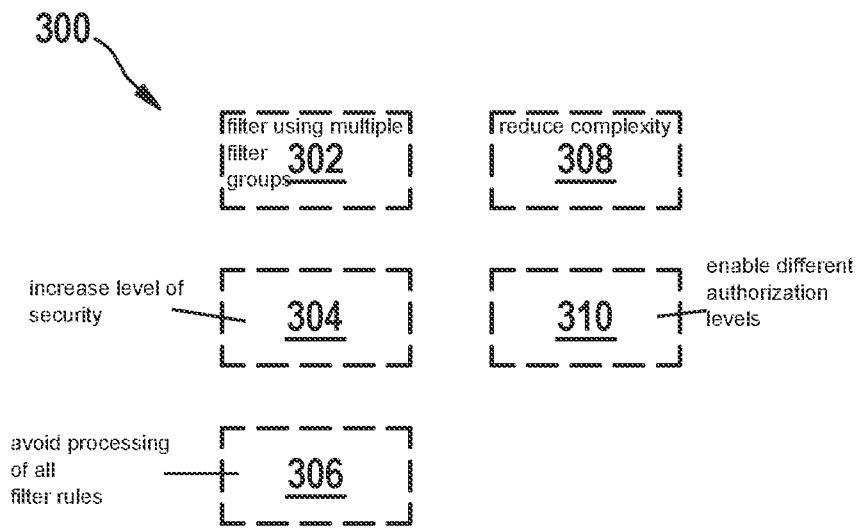

FIG. 7 schematically shows aspects of uses according to further exemplary specific embodiments of the present invention.

Figure 8:
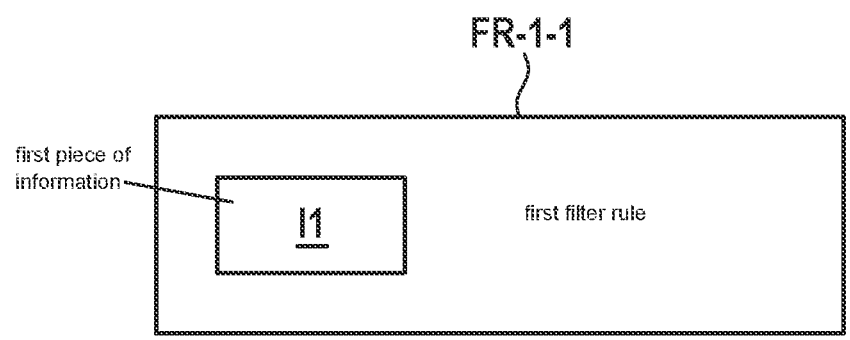

FIG. 8 schematically shows a simplified block diagram of a device according to further exemplary specific embodiments of the present invention.

DETAILED DESCRIPTION OF EXAMPLE EMBODIMENTS

FIG. 1A schematically shows a simplified flowchart of a method for processing data associated with messages transmittable via a bus system according to exemplary specific embodiments. The method may be carried out in further exemplary specific embodiments, for example, by a device 200, cf. FIG. 2. In further exemplary specific embodiments, device 200 may also be integrated in another device 20, 28, cf. FIG. 3, for example, a bus user 20, 28.

Bus user 20 may include, for example, a transceiver 28a for sending (TX) and/or receiving (RX) messages N via a bus system 10.

In further exemplary specific embodiments, bus system 10 is, for example, a CAN bus or a CAN FD or CAN XL bus system 10. For example, bus system 10 may include a differential transmission medium 12, for example, including two bus lines 12a, 12b.

In further exemplary specific embodiments, FIG. 1A, the method includes: providing 100 multiple filter groups FG-1, FG-2, FG-3, each filter group of the multiple filter groups FG-1, FG-2, FG-3 including at least one filter rule, for example, for at least some of messages N (FIG. 3), filtering 102 (FIG. 1A) at least one message N, IF with the aid of at least two different filter groups FG-1, FG-2 of the multiple filter groups FG-1, FG-2, FG-3. In further exemplary specific embodiments, this enables a flexible definition of (resulting) filters, which are based, for example, on the multiple filter groups and the filter rules contained in each of them, for example, on a successive execution of filter rules of first filter group FG-1 and of filter rules of second filter group FG-2.

FIG. 4 schematically shows for this purpose a simplified block diagram according to further exemplary specific embodiments. A data frame IF to be filtered, for example corresponding to a received message N, cf. FIG. 3, is filtered using three filter groups FG-1, FG-2, FG-3 in the present case by way of example, the three filter groups FG-1, FG-2, FG-3 having been obtained, for example, with the aid of block 100 according to FIG. 1A.

First filter group FG-1 includes, for example, four filter rules FR-1-1, FR-1-2, FR-1-3, FR-1-4, which are evaluated in succession, for example, in further exemplary specific embodiments. It is thus checked in succession, for example, whether data frame IF to be filtered corresponds to first filter rule FR-1-1, then whether data frame IF to be filtered corresponds to second filter rule FR-1-2, etc. In the present case, data frame IF to be filtered does not correspond to first filter rule FR-1-1, for example, but it corresponds to second filter rule FR-1-2, so that after the check of second filter rule FR-1-2, the filtering is continued using second filter group FG-2, cf. arrow a1.

Second filter group FG-2 according to FIG. 4 also includes, for example, four filter rules FR-2-1, FR-2-2, FR-2-3, FR-2-4, which are evaluated in succession, for example, in further exemplary specific embodiments. In the present case, data frame IF to be filtered does not correspond, for example, to first and second filter rule FR-2-1, FR-2-2 of second filter group FG-2, but it corresponds to third filter rule FR-2-3, so that after the check of third filter rule FR-2-3, the filtering is continued using third filter group FG-3, cf. arrow a2.

Third filter group FG-3 according to FIG. 4 includes, for example, three filter rules FR-3-1, FR-3-2, FR-3-3, which are evaluated in succession, for example, in further exemplary specific embodiments. In the present case, data frame IF to be filtered does not correspond, for example, to first filter rule FR-3-1 of third filter group FG-3, but it corresponds to second filter rule FR-3-2, so that the filtering is aborted after checking second filter rule FR-3-2, cf. arrow a3.

In further exemplary specific embodiments, the filtering described above by way of example with reference to FIG. 4 may be understood as a virtual filtering process F1, which is made up of the described evaluations of the multiple filter groups FG-1, FG-2, FG-3.

In further exemplary specific embodiments, FIG. 1B, it is provided that providing 100 (FIG. 1A) the multiple filter groups at least includes: associating 100a a first number of filter rules FR-1-1, . . . , FR-1-4 (FIG. 4) with a first filter group FG-1, associating 100b a second number of filter rules FR-2-1, . . . , FR-2-4 (FIG. 4) with a second filter group FG-2.

In further exemplary specific embodiments, FIG. 1C, it is provided that the method furthermore includes: predefining 110 a sequence RF of the at least two different filter groups FG-1, FG-2, for example, for filtering 102 (FIG. 1A).

In further exemplary specific embodiments, FIG. 1C, it is provided that the method furthermore includes: assigning 112 different access rights ZR to the at least two different filter groups FG-1, FG-2. For example, in further exemplary specific embodiments, the filter groups as such and/or their linkage and/or the access rights to at least one filter group may be permanently predefined in an implementation, or partially configurable, or completely configurable.

In further exemplary specific embodiments, FIG. 1C, it is provided that the method furthermore includes: assigning 114 different functionalities FUN to the at least two different filter groups FG-1, FG-2, for example, different functionalities FUN characterizing at least one of the following elements: a) rule type, b) maximum number of filter rules per filter group.

In further exemplary specific embodiments, it is provided that the method furthermore includes: a) at least temporarily filtering 116a messages to be sent via bus system 10 (FIG. 3), cf. the TX branch between device 200, which is designed, for example, for carrying out the method according to the specific embodiments, and transceiver 28a, and/or at least temporarily filtering 116b (FIG. 1C) messages received via bus system 10, cf. the RX branch.

In further exemplary specific embodiments, a message N to be sent may only actually be sent via bus system 10, for example, if the message has corresponded to at least one filter rule of each of the multiple filter groups, for example, in the case of FIG. 4, FR-1-2. FR-2-3. FR-3-2. In this case, the message is conveyed, for example, by the device via the TX branch to transceiver 28a (FIG. 4).

In further exemplary specific embodiments, message N to be sent may be supplied to device 200 or a CAN controller 28 including it by an application program 22 which is executable on bus user 20.

In further exemplary specific embodiments, bus user 20 may also include an operating system 24, and optionally a hardware security module 26.

In further exemplary specific embodiments, at least one of the components may at least temporarily control, with the aid of control signals C1, C2, C3, an operation of device 200, for example filtering 102 and/or providing 100 or associating 100a, 100b.

In further exemplary specific embodiments, a message N received by bus system 10 may be supplied via the RX branch to device 200, for example, for filtering, received message N only being conveyed, for example, to application program 22 if received message N has corresponded to at least one filter rule of each of the multiple filter groups.

In further exemplary specific embodiments, at least one filter rule may also be provided which provides direct acceptance of a message, i.e., for example, with skipping of further (for example all) filter groups.

In further exemplary specific embodiments, FIG. 1D, it is provided that the method furthermore includes: evaluating 120 in temporal succession multiple filter rules FR-1-1, FR-1-2, . . . of a first filter group FG-1 with respect to the at least one message N, IF.

In further exemplary specific embodiments, it is provided that the method furthermore includes: checking 122 whether one of the multiple filter rules FR-1-1, FR-1-2, . . . , applies to the at least one message N, IF and, optionally, if one of the multiple filter rules applies to the at least one message, evaluating 124 at least one filter rule FR-2-1 of at least one second filter group FG-2, second filter group FG-2 being different from first filter group FG-1. In further exemplary specific embodiments, this principle may also be expanded to further filter groups FG-3, . . . , for example, by checking whether the at least one filter rule FR-2-1 of second filter group FG-2 applies to the at least one message and, optionally, if the at least one filter rule of the second filter group applies to the at least one message, evaluating at least one filter rule FR-3-1 of at least one third filter group FG-3, third filter group FG-3 being different, for example, from first filter group FG-1 and/or from second filter group FG-2.

In further exemplary specific embodiments, it is provided that the method furthermore includes: discarding 126 the at least one message if no filter rule of the multiple filter groups applies. In further exemplary specific embodiments, it is provided that if a filter rule of at least one of the multiple filter groups applies, thus a message filtered or checked thereby corresponds to the filter criterion or the filter criteria of the filter rule, the message is, for example, not discarded, but rather, for example, is further processed, cf., for example, optional block 127 from FIG. 1D, for example, within the scope of a receiving process or a sending process, cf., for example, arrow a3 from FIG. 4.

In further exemplary specific embodiments, FIG. 1E, it is provided that the method furthermore includes: associating 130 filter rules which relate to a VCAN ID and/or a useful data type (for example, data field "PT", payload type) with a first filter group of the multiple filter groups, and/or associating 132 filter rules which relate to a message identification (for example, message ID) and/or an address (for example, IP, Internet protocol) of a sender and/or receiver, with a second filter group of the multiple filter groups. In further exemplary specific embodiments, a differing sequence of the filter groups is possible. In further exemplary specific embodiments, a sequence of the filter groups is, for example, not relevant for associating 130 the filter rules.

In further exemplary specific embodiments, FIG. 1F, it is provided that the method furthermore includes: at least partially temporally overlapping evaluation 140 of filter rules of the same and/or different filter groups, for example, results of the evaluation of filter rules of the same filter group being subjected 142 to an OR linkage with one another, for example, results of OR linkages of different filter groups being subjected to an AND linkage with 144 with one another.

In further exemplary specific embodiments, FIG. 8, it is provided that at least one first filter rule FR-1-1 includes a first piece of information I1, which characterizes at least one further filter rule and/or one further filter group, which is to be evaluated, for example, after the evaluation of first filter rule FR-1-1. Based on first piece of information I1, in further exemplary specific embodiments, filtering of a message may thus be continued with the filter rules thus specified or the filter group thus specified.

Further exemplary specific embodiments, FIG. 2, relate to a device 200 for carrying out the method according to the specific embodiments.

In further exemplary specific embodiments, it is provided that device 200 includes: a computing unit ("computer") 202, a memory unit 204 associated with computing unit 202 for at least temporarily storing at least one of the following elements: a) data DAT, b) computer program PRG, in particular for carrying out a method according to the exemplary specific embodiments.

In further preferred specific embodiments, memory unit 204 includes a volatile memory 204a (for example, working memory (RAM)) and/or a nonvolatile memory (NVM) 204b (for example, flash EEPROM).

In further exemplary specific embodiments, computing unit 202 includes at least one of the following elements or is designed as at least one of these elements: microprocessor (µP), microcontroller (µC), application-specific integrated circuit (ASIC), system on chip (SoC), programmable logic component (for example, FPGA (field programmable gate array)), hardware circuit, or any combinations thereof.

Further exemplary specific embodiments relate to a computer-readable storage medium SM, including commands PRG, which, when they are executed by a computer 202, prompt it to carry out the method according to the specific embodiments.

Further exemplary specific embodiments relate to a computer program PRG, including commands, which, when the program is executed by a computer 202, prompt it to carry out the method according to the specific embodiments.

Further exemplary specific embodiments relate to a data carrier signal DCS, which characterizes and/or transmits computer program PRG according to the specific embodiments. Data carrier signal DCS is receivable, for example, via an optional data interface 206 of device 200.

Further exemplary specific embodiments relate to a bus user 20, 28 for a bus system 10, including at least one of the following elements: a) a device 200 according to the specific embodiments, b) a computer-readable storage medium SM according to the specific embodiments, c) a computer program PRG according to the specific embodiments, d) a data carrier signal DCS or a representation of data carrier signal DCS according to the specific embodiments.

Further aspects and exemplary specific embodiments are described hereinafter with reference to filter process F1 according to FIG. 4.

Above-mentioned data frame IF is received by bus system 10 (FIG. 3), for example, with the aid of transceiver 28a, and supplied to device 200 for processing, for example, filtering. It is assumed, for example, that data frame IF includes an ID=42 and a VCAN ID=2, and a useful data type PT of 10.

In further exemplary specific embodiments, filter rules FR-1-1, . . . , FR-1-4 of first filter group FG-1 are sequentially applied to data frame IF until a "match" (hit, thus correspondence of a property of data frame IF with a filter rule) is achieved. In the present case, filter rules are associated with first filter group FG-1, which check for values of the VCAN ID field. For example, filter rule FR-1-1 may check whether a VCAN ID of data frame IF includes a value of 1, "VCAN ID==1". For example, filter rule FR-1-2 may check whether a VCAN ID of data frame IF includes a value of 2, "VCAN ID==2". For example, filter rule FR-1-3 may check whether a VCAN ID of data frame IF includes a value of 3, "VCAN ID==3". Filter rule FR-1-4 establishes, for example, that in other cases, when the VCAN ID of data frame IF does not include any of values 1, 2, 3, data frame IF is discarded. Within the scope of the exemplary sequential checking of filter rules FR-1-1, . . . , it is established that data frame IF is associated with VCAN ID 2. Filter group FG-1 has thus accepted the data frame. The processing of first filter group FG-1 is thus ended, cf. arrow a1.

Now, for example, second filter group FG-2 is applied to data frame IF, for example, the PT (payload type, useful data type) of the data frame being checked.

For example, filter rule FR-2-1 may check whether useful data type PT of data frame IF includes a value of 1, "PT==1". For example, filter rule FR-2-2 may check whether useful data type PT of data frame IF includes a value of 4, "PT==4". For example, filter rule FR-2-3 may check whether useful data type PT of data frame IF includes a value of 10, "PT==10". Filter rule FR-2-4 establishes, for example, that in other cases, if useful data type PT of data frame IF does not include any of values 1, 4, 10, data frame IF is discarded by second filter group FG-2.

Within the scope of the exemplary sequential checking of filter rules FR-2-1, . . . , of second filter group FG-2, for example, it is established that data frame IF has useful data type PT=10. Second filter group FG-2 includes thus accepted data frame IF. The processing of the filter rules of second filter group FG-2 is thus ended, cf. arrow a2.

Since third filter rule FR-2-3 of second filter group FG-2 has resulted in a hit (match), since the PT field of data frame IF is 10, data frame IF is thus accepted by second filter group FG-2 (thus, for example, not discarded, cf. filter rule FR-2-4) and conveyed to third filter group FG-3, see arrow a2.

Now, for example, third filter group FG-3 is applied to data frame IF, using which, for example, a CAN-ID field of the data frame is checked.

For example, filter rule FR-3-1 may check whether the CAN-ID of data frame IF includes a value of 23, "CAN ID==23". For example, filter rule FR-3-2 may check whether the CAN-ID of data frame IF includes a value of 42, "CAN ID==42". Filter rule FR-3-3 establishes, for example, that in other cases, if the CAN ID of data frame IF does not include one of values 23, 42, data frame IF is discarded by third filter group FG-3.

As assumed above by way of example, the CAN-ID field corresponds to value 42, and therefore data frame IF is accepted and conveyed, for example, to software 22 (FIG. 3).

In contrast, a received message which does not correspond to at least one filter rule of each of the, for example, three filter groups FG-1, FG-2, FG-3, would be discarded, for example, by one of filter groups FG-1, FG-2, FG-3, cf., for example, particular corresponding filter rule FR-1-4, FR-2-4, FR-3-3.

In further exemplary specific embodiments, the CAN ID relates to the data frame ID in classic CAN and CAN FD frames, and to the priority ID in CAN XL frames. Further exemplary specific embodiments relate to all three CAN variants (classic, FD, XL) for example, in each case to the ID at the beginning of data frame IF.

In further exemplary specific embodiments, for example, alternatively or additionally, an IP address which is contained in the data field of data frame IF may be checked, for example, with the aid of a filter group or at least some filter rules (of at least one filter group).

The frame formats of CAN FD and classic CAN include a CAN-ID field ("frame identifier"). If desired, in further exemplary specific embodiments, the further fields may possibly be accommodated in the data field because this is user specific. In further exemplary specific embodiments, it is also possible to use parts (for example, several bits) of the CAN ID to code pieces of information such as VCAN ID or a useful data type PT.

In further exemplary specific embodiments, the principle according to the specific embodiments may be used both in receiving ("frame reception (RX)") and also in emitting ("frame emission (TX)"), for example, in CAN XL (or similar protocols) and in further exemplary specific embodiments it may also be used at the same time for both directions RX, TX.

FIG. 5 schematically shows a simplified block diagram according to further exemplary specific embodiments in which an aggregated filter F2 is provided for filtering data frames IF using a total of four filter groups FG-1, FG-2, FG-3, FG-4.

Filter rules FR-1-1, . . . , FR-1-4 according to FIG. 5 generally correspond to filter rules FR-1-1, . . . , FR-1-4 according to FIG. 4, each of filter rules FR-1-1, . . . , FR-1-4 indicating, in addition to a filter criterion (here, for example, various values of a VCAN ID) which filter rule or filter group is to be executed following the check of the particular filter rule ("jump target"), cf. arrows a4, a5, a6, a7, a8. For example, arrow a4 indicates that after an evaluation of filter rule FR-1-1 of first filter group FG-1, filter rule FR-2-1 of second filter group FG-2 is to be checked, etc.

For example, filter rule FR-2-1 of filter group FG-2 according to FIG. 5 may check whether the CAN ID of data frame IF is in a value range between 0 and 100, for example, 0<CAN ID<100, and optionally indicate as a jump target for a following filtering, for example, fourth filter group FG-4, cf. arrow a7.

For example, filter rule FR-2-2 of filter group FG-2 according to FIG. 5 may check whether the CAN ID of data frame IF is greater than 1337, for example, CAN ID>1337, and optionally indicate a sixth filter group (not shown) as the jump target for a following filtering, cf. arrow a8.

For example, filter rules FR-4-1, FR-4-2, FR-4-3 according to FIG. 5 generally correspond to filter rules FR-3-1, FR-3-2, FR-3-3 according to FIG. 4.

Further exemplary specific embodiments relate to a configuration of the filter rules in the filter groups, cf., for example, FIG. 6.

In further exemplary specific embodiments, the processing of the filter rules in at least one filter group may be subject to a rights restriction so that, for example, only software 22 which runs in specific parts, for example, of a bus user 20 (FIG. 3) or control unit, may process the filter rules.

In further exemplary specific embodiments, the rights restrictions or authorizations may differ, for example, between filter groups. Thus, for example, a configuration of filter rules or filter groups may each be restricted to one or multiple of the following elements: hardware bootrom 26', hardware security module (HSM) 26', boot loader 26', cf. configuration connection C1' according to FIG. 6, OS (operating system) 24, cf. configuration connection C2', software module (driver, protocol stack, etc.), application 22, cf. configuration connection C3' according to FIG. 6.

Thus, for example, HSM 26' may enforce that application 22 may only emit and/or receive data frames DR' including a certain VCAN ID. This is also enforced in further exemplary specific embodiments by hardware 26' 28', for example, if application 22 is supposed to have been compromised by an attacker at the runtime.

FIG. 6 shows an exemplary logical representation. This means, application 22, OS 24, and HSM 26' in one implementation do not have to have three actual separate interfaces C1', C2', C3' to device 200, which implement, for example, hierarchical filter F with the aid of the multiple filter groups FG-1', FG-2', FG-3', but rather, for example, a logical differentiability is sufficient. Example: Because the filter configuration of filter groups FG-1', FG-2', FG-3' may be in different memory addresses of a memory 204 (FIG. 2) these modules 26', 24, 22 may use, for example, the same physical interface 206 and the access protection may be achieved, for example, via memory access rights.

In further exemplary specific embodiments, at least one filter rule may filter for a) a field or bit in the header of the data frame, for example, ID field, data frame type, bits including pieces of information about the data frame, VCAN ID, payload type, b) a field or bit in the data field (useful data, payload) of the data frame which may be up to 2048 bytes in the case of CAN XL, this is, for example, usable for, for example, an additional ID field, ID field in encapsulated protocol (for example, the IP address), other data field, c) for any arbitrary fields or properties (for example, which may be characterized by one or multiple coherent or noncoherent bit patterns) of the data frame; a further exemplary property of the data frame which may be filtered in further exemplary specific embodiments would be, for example, that it is a CAN XL data frame or a CAN FD frame ("CAN type" of the data frame).

Further exemplary specific embodiments, FIG. 7, relate to a use 300 of the method according to the specific embodiments and/or the device according to the specific embodiments and/or the computer-readable storage medium according to the specific embodiments and/or the computer program according to the specific embodiments and/or the data carrier signal according to the specific embodiments and/or the bus user according to the specific embodiments for at least one of the following elements: a) filtering 302, for example, hierarchical filtering of the at least one message with the aid of multiple filter groups, b) increasing 304 a level of security, c) avoiding 306 processing of all existing filter rules, d) reducing 308 a complexity of individual filter rules, e) enabling 310 different authorization levels with respect to a use of filters or filter rules or filter groups.

The principle according to the specific embodiments is not restricted to a CAN or CAN-based bus system 10, but in further exemplary specific embodiments may also be applied to other systems for processing, for example, sending and/or receiving messages.

In further exemplary specific embodiments, the application of the principle according to the specific embodiments may reduce, for example, an interrupt load on a computing unit of the bus user on which, for example, software for receiving messages is executed.

What is claimed is:

1. A method for processing data associated with messages transmittable via a bus system, the method comprising the following steps:
providing multiple filter groups, each filter group of the multiple filter groups including a plurality of filter rules; and
filtering at least one message using at least two different filter groups of the multiple filter groups, wherein:
the first filter group includes more than two filter rules,
the at least one message is filtered by a first filter rule of the first filter group,
the first filter rule of the first filter group passes the at least one message to a second filter rule of the first filter group,
the second filter rule of the first filter group bypasses a remainder of the more than two filter rules of the first filter group and bypasses all filter rules of a second filter group by specifying
a third filter group of the multiple filter groups as a jump target to which the filtering of the at least one message proceeds by skipping the second filter group in order to apply the filtering of the third filter group to the message.

2. The method as recited in claim 1, wherein the providing of the multiple filter groups includes:
associating a first number of filter rules with a first filter group of the multiple filter groups; and
associating a second number of filter rules with a second filter group of the multiple filter groups.

3. The method as recited in claim 1, further comprising:
predefining a sequence of at least two different filter groups.

4. The method as recited in claim 3, wherein the predefining is for the filtering.

5. The method as recited in claim 1, further comprising:
assigning different access rights to the at least two different filter groups.

6. The method as recited in claim 1, further comprising:
assigning different functionalities to the at least two different filter groups.

7. The method as recited in claim 6, wherein the different functionalities characterize at least one of the following elements: a) rule type, b) maximum number of filter rules per filter group.

8. The method as recited in claim 1, further comprising:
at least temporarily filtering messages to be sent via the bus system, and/or
at least temporarily filtering messages received via the bus system.

9. The method as recited in claim 1, further comprising:
evaluating in temporal succession multiple filter rules of a first filter group of the multiple filter groups with respect to the at least one message.

10. The method as recited in claim 9, further comprising:
checking whether one of the multiple filter rules applies to the at least one message; and
based on one of the multiple filter rules applying to the at least one message, evaluating at least one filter rule of at least one second filter group of the multiple filter groups, the second filter group being different from the first filter group.

11. The method as recited in claim 1, further comprising:
discarding the at least one message when no filter rule of the multiple filter groups applies.

12. The method as recited in claim 1, further comprising:
associating filter rules which relate to a VCAN (virtual controller area network) ID and/or a useful data type with a first filter group of the multiple filter groups; and/or
associating filter rules which relate to: (i) a message identification of a sender and/or receiver, and/or (ii) an address of a sender and/or receiver, with a second filter group of the multiple filter groups.

13. The method as recited in claim 1, further comprising:
at least partially temporally overlapping evaluation of filter rules of the same and/or different filter groups.

14. The method as recited in claim 1, wherein results of the evaluation of filter rules of the same filter group are subjected to an OR linkage with one another, and results of the OR linkages of different filter groups being subjected to an AND linkage with one another.

15. The method as recited in claim 1, wherein at least one first filter rule includes a first piece of information which characterizes at least one further filter rule and/or one further filter group, which is to be evaluated after the evaluation of the first filter rule.

16. The method as recited in claim 1, wherein the method is used for at least one of the following: a) hierarchical filtering of the at least one message using the multiple filter groups, b) increasing a level of security, c) avoiding processing of all existing filter rules, d) reducing a complexity of individual filter rules, e) enabling different authorization levels with respect to a use of filters.

17. A device for processing data associated with messages transmittable via a bus system, the device configured to:
provide multiple filter groups, each filter group of the multiple filter groups including a plurality of filter rules; and
filter at least one message using at least two different filter groups of the multiple filter groups, wherein:
the first filter group includes more than two filter rules,
the at least one message is filtered by a first filter rule of the first filter group,
the first filter rule of the first filter group passes the at least one message to a second filter rule of the first filter group,
the second filter rule of the first filter group bypasses a remainder of the more than two filter rules of the first filter group and bypasses all filter rules of a second filter group by specifying
a third filter group of the multiple filter groups as a jump target to which the filtering of the at least one message proceeds by skipping the second filter group in order to apply the filtering of the third filter group to the message.

18. A non-transitory computer-readable storage medium on which are stored for processing data associated with messages transmittable via a bus system, the commands, when executed by a computer, causing the computer to perform the following steps:
providing multiple filter groups, each filter group of the multiple filter groups including a plurality of filter rules; and
filtering at least one message using at least two different filter groups of the multiple filter groups, wherein:
the first filter group includes more than two filter rules,
the at least one message is filtered by a first filter rule of the first filter group, the first filter rule of the first filter group passes the at least one message to a second filter rule of the first filter group, the second filter rule of the first filter group bypasses a remainder of the more than two filter rules of the first filter group and bypasses all filter rules of a second filter group by specifying a third filter group of the multiple filter groups as a jump target to which the filtering of the at least one message proceeds by skipping the second filter group in order to apply the filtering of the third filter group to the message.

19. A bus user for a bus system, the bus being configured for processing data associated with messages transmittable via a bus system, the bus user configured to:

provide multiple filter groups, each filter group of the multiple filter groups including a plurality of filter rules; and filter at least one message using at least two different filter groups of the multiple filter groups, wherein:

the first filter group includes more than two filter rules, the at least one message is filtered by a first filter rule of the first filter group, the first filter rule of the first filter group passes the at least one message to a second filter rule of the first filter group, the second filter rule of the first filter group bypasses a remainder of the more than two filter rules of the first filter group and bypasses all filter rules of a second filter group by specifying a third filter group of the multiple filter groups as a jump target to which the filtering of the at least one message proceeds by skipping the second filter group in order to apply the filtering of the third filter group to the message.

\* \* \* \* \*